US011323035B2

(12) United States Patent
Romanov et al.

(10) Patent No.: US 11,323,035 B2
(45) Date of Patent: May 3, 2022

(54) DC VOLTAGE-PULSE VOLTAGE CONVERTER

(71) Applicant: Closed-up Joint-Stock Company DRIVE, Novosibirsk (RU)

(72) Inventors: Yuriy I. Romanov, Novosibirsk (RU); Stanislav V. Maletskiy, Novosibirsk (RU)

(73) Assignee: Drive CJSC, Novosibirsk (RU)

( * ) Notice: Subject to any disclaimer, the term of this patent is extended or adjusted under 35 U.S.C. 154(b) by 232 days.

(21) Appl. No.: 16/092,194

(22) PCT Filed: Jun. 2, 2017

(86) PCT No.: PCT/RU2017/000385
§ 371 (c)(1),
(2) Date: Oct. 8, 2018

(87) PCT Pub. No.: WO2018/222068
PCT Pub. Date: Dec. 6, 2018

(65) Prior Publication Data
US 2021/0159800 A1        May 27, 2021

(51) Int. Cl.
*H02M 3/335*        (2006.01)
*H02M 3/158*        (2006.01)
(Continued)

(52) U.S. Cl.
CPC .......... *H02M 3/33507* (2013.01); *G05F 1/56* (2013.01); *G05F 3/16* (2013.01); *H02M 3/1588* (2013.01);
(Continued)

(58) Field of Classification Search
CPC . H02M 3/3353; H02M 3/337; H02M 3/33569
See application file for complete search history.

(56) References Cited

U.S. PATENT DOCUMENTS 4,594,649 A * 6/1986 Rhoads ............. H02M 7/53835
                                                            363/131
5,903,138 A * 5/1999 Hwang ................. H02M 3/156
                                                            323/266

(Continued)

FOREIGN PATENT DOCUMENTS

RU        2528565        9/2014
SU        1807554        4/1993

OTHER PUBLICATIONS

Appl. Note AN-6920MR "Integrated Critical-Mode PFC / Quasi-Resonant Current-Mode PWM Controller FAN6920" , 2010, Fairchild Semiconductor Corp., Rev. 1.0.0., Mar. 10, 2011.

*Primary Examiner* — Alex Torres-Rivera
(74) *Attorney, Agent, or Firm* — Patentagar PLLC; Alexander Rabinovich

(57) ABSTRACT

A DC voltage-pulse voltage converter comprises connected in series a high DC voltage source, a first controllable switch, an inductive load, a second controllable switch, an electronically controlled resistor (ECR), and a limiting resistor, as well as a controllable square wave generator, and the first and the second control voltage drivers. Providing the second control voltage driver and the ECR allows regulating the value (amplitude) of the current flowing through the inductive load. As the amplitude of the current decreases, so does the level of EMI.

2 Claims, 3 Drawing Sheets

(51) Int. Cl.
*G05F 3/16* (2006.01)
*G05F 1/56* (2006.01)

(52) U.S. Cl.
CPC ..... *H02M 3/3353* (2013.01); *H02M 3/33569* (2013.01)

(56) References Cited

U.S. PATENT DOCUMENTS

| | | | | |
|---|---|---|---|---|
| 10,447,167 | B1* | 10/2019 | Romanov | .............. H02M 11/00 |
| 2007/0070659 | A1* | 3/2007 | Sawtell | ................ H02M 1/088 |
| | | | | 363/21.01 |
| 2009/0316444 | A1* | 12/2009 | Yamaguchi | ......... H02M 3/3353 |
| | | | | 363/21.12 |
| 2013/0063985 | A1* | 3/2013 | Ye | ....................... H02M 3/3353 |
| | | | | 363/21.05 |
| 2013/0194027 | A1* | 8/2013 | Ivankovic | ............ H03K 17/102 |
| | | | | 327/430 |
| 2015/0198963 | A1* | 7/2015 | Romanov | ........... H02M 3/1588 |
| | | | | 323/312 |

* cited by examiner

DC VOLTAGE-PULSE VOLTAGE CONVERTER

CROSS-REFERENCE TO RELATED APPLICATIONS

This application is a U.S. National phase CIP application of International application PCT/RU2017/000385 (publication WO2018/222068) filed on Jun. 2, 2017, the International application being hereby incorporated by reference in its entirety.

BACKGROUND OF THE INVENTION

1. Field of the Invention

The proposed engineering solution relates to electrical engineering and can be used in pulse power supply having reduced level of electromagnetic noise radiated to the environment, and as an additional technique widening capacities for DC voltage-pulse voltage conversion.

2. Description of Related Art

Known in the art has been counterparts such as that disclosed in the Russian patent RU 2528565. The prior art converter comprises the following aggregation of essential features:

a high DC voltage source (HDCVS);

a first controllable switch connected by a first terminal thereof to a positive terminal of the HDCVS;

an inductive load (made as a primary winding of a transformer having a secondary winding connected to a rectifier) connected by a first terminal thereof to a second terminal of the first controllable switch;

a second controllable switch connected by a first terminal thereof to a second terminal of the inductive load and connected by a second terminal thereof to a negative terminal of the HDCVS;

a square wave generator (representing a first control circuit) connected by an output thereof to a control input of the first controllable switch;

a second control circuit connected by an output thereof to a control input of the second controllable switch;

a first pick-off diode connected by an anode thereof to the second terminal of the inductive load and connected by a cathode thereof to the positive terminal of the HDCVS;

a second pick-off diode connected by a cathode thereof to the second terminal of the first controllable switch and connected by an anode thereof to the negative terminal of the HDCVS.

The features which are common for the proposed solution and the above analog are:

the HDCVS;

the first controllable switch connected by the first terminal thereof to the positive terminal of the HDCVS;

the inductive load connected by the first terminal thereof to the second terminal of the first controllable switch;

the second controllable switch connected by the first terminal thereof to the second terminal of the inductive load;

the square wave generator;

the first pick-off diode connected by the anode thereof to the second terminal of the inductive load and connected by the cathode thereof to the positive terminal of the HDCVS;

the second pick-off diode connected by the cathode thereof to the second terminal of the first controllable switch and connected by the anode thereof to the negative terminal of the HDCVS.

Also known in the art has been a design disclosed in the Application Note AN-6920MR "Integrated Critical-Mode PFC/Quasi-Resonant Current-Mode PWM Controller FAN6920", 2010, Fairchild Semiconductor Corporation, Rev. 1.0.0., Mar. 10, 2011. The design was selected as the closest analog (prototype), and it comprises the following aggregation of essential features:

a HDCVS;

a first (storage) capacitor connected by one (a first) plate thereof to a positive terminal of the HDCVS and connected by another (a second) plate thereof to a negative terminal of the HDCVS;

a first controllable switch connected by a first terminal thereof to the positive terminal of the HDCVS;

an inductive load (made as a primary winding of a transformer having a secondary winding connected to a rectifier) connected by a first terminal thereof to a second terminal of the first controllable switch;

a second controllable switch connected by a first terminal thereof to a second terminal of the inductive load;

a limiting resistor connected by one of the terminals thereof to a second terminal of the second controllable switch and connected by another terminal thereof to the negative terminal of the HDCVS;

a low DC voltage source (LDCVS) (presented by a third winding of the transformer, a rectifying diode, and a filtering capacitor) connected by a negative terminal thereof to the negative terminal of the HDCVS;

a controllable square wave generator connected by an output thereof via a matching buffer to a control input of the second controllable switch;

a control voltage driver connected by an output thereof to an input of the controllable square wave generator;

a first diode (a boost diode) connected by an anode thereof to a positive terminal of the LDCVS;

a second capacitor (a boost capacitor) connected by a first plate thereof to a cathode of the first diode (the boost diode) and connected by a second plate thereof to a second terminal of the first controllable switch;

a second diode (a first pick-off diode) connected by a cathode thereof to the second terminal of the first controllable switch and connected by an anode thereof to the negative terminal of the HDCVS;

a third diode (a second pick-off diode) connected by an anode thereof to the second terminal of the inductive load and connected by a cathode thereof to the positive terminal of the HDCVS;

a third controllable switch connected by a first input thereof to the first plate of the second capacitor (the boost capacitor), connected by a second input thereof to the second plate of the second capacitor (the boost capacitor), connected by a control input thereof to the output of the controllable square wave generator, and connected by an output thereof to a control input of the first controllable switch.

The features which are common for the proposed solution and the above analog are:

the HDCVS;

the first (storage) capacitor connected by one (the first) plate thereof to a positive terminal of the HDCVS and connected by the other (the second) plate thereof to the negative terminal of the HDCVS;

the first controllable switch connected by the first terminal thereof to the positive terminal of the HDCVS;

the inductive load connected by the first terminal thereof to the second terminal of the first controllable switch;

the second controllable switch connected by the first terminal thereof to the second terminal of the inductive load;

the limiting resistor;

the LDCVS connected by the negative terminal thereof to the negative terminal of the HDCVS;

the controllable square wave generator connected by the output thereof via the matching buffer to the control input of the second controllable switch;

the control voltage driver connected by the output thereof to the input of the controllable square wave generator;

the first diode (the boost diode) connected by the anode thereof to the positive terminal of the LDCVS;

the second capacitor (the boost capacitor) connected by the first plate thereof to the cathode of the first diode (the boost diode) and connected by the second plate thereof to the second terminal of the first controllable switch;

the second diode (the first pick-off diode) connected by the cathode thereof to the second terminal of the first controllable switch and connected by the anode thereof to the negative terminal of the HDCVS;

the third diode (the second pick-off diode) connected by the anode thereof to the second terminal of the inductive load and connected by the cathode thereof to the positive terminal of the HDCVS;

the third controllable switch connected by the first input thereof to the first plate of the second capacitor (the boost capacitor), connected by the second input thereof to the second plate of the second capacitor (the boost capacitor), connected by the control input thereof to the output of the controllable square wave generator, and connected by the output thereof to the control input of the first controllable switch.

SUMMARY OF THE INVENTION

The technical result, that can be achieved by neither of the above-discussed designs-analogs, resides in decreasing (reducing) the level of pulse electromagnetic interference (EMI) radiated in the environment by DC voltage-to-pulse voltage converters, which radiation results from controlling the change of the value of the linearly-increasing current in a inductive load. In this way, the proposed converter adds to currently available DC voltage—pulse voltage converters.

The reason why the above-mentioned technical result was impossible to attain lies in the lack of due attention paid until now to decreasing the level of the EMI, even though pulse EMI always take place in prior art DC voltage—pulse voltage converters as a result of radiation in the environment of a portion of the pulse power created in the inductive load.

The pulse EMI arising in these converters disturbs nearby electronics and negatively affects the operation thereof. It is a serious obstacle in fulfilling requirements related to electromagnetic compatibility in, specifically, the systems with distributed power supply using a plurality of switched power boxes. Additionally, the radiation of pulse EMI into the environment worsens the ecological situation in the human habitat. Therefore, there appeared a pressing need in improving known comparable technical solutions.

Taking the character and analysis of the prior art designs into account, it can be concluded that the object of providing DC voltage—pulse voltage converters, which secure decreasing the level of pulse EMI radiated into the environment, is a timely one.

The above-identified technical result is accomplished in a DC voltage-to-pulse voltage converter (DCVPVC) comprising a HDCVS, a first (storage) capacitor which is connected by one (a first) of the plates thereof to a positive terminal of the HDCVS and which is also connected by another (a second) plate thereof to a negative terminal of the HDCVS. The DCVPVC also comprises a first controllable switch, which is connected by a first terminal thereof to the positive terminal of the HDCVS, and an inductive load connected by a first terminal thereof to a second terminal of the first controllable switch. The DCVPVC also comprises a second controllable switch, which is connected by a first terminal thereof to a second terminal of the inductive load, and a limiting resistor. The DCVPVC also comprises an LDCVS, which is connected by a negative terminal thereof to the negative terminal of the HDCVS, and a controllable square wave generator, which is connected by an output thereof to a control input of the second controllable switch. The DCVPVC also comprises a control voltage driver, which is connected by an output thereof to an input of the controllable square wave generator, and a first diode (a boost diode), which connected by an anode thereof to a positive terminal of the LDCVS. The DCVPVC also comprises a second capacitor (a boost capacitor), which is connected by a first plate thereof to a cathode of the first diode (the boost diode) and is connected by a second plate thereof to a second terminal of the first controllable switch, and a second diode (a first pick-off diode), which is connected by a cathode thereof to a second terminal of the first controllable switch and is connected by an anode thereof to the negative terminal of the HDCVS. The DCVPVC also comprises a third diode (a second pick-off diode), which is connected by an anode thereof to the second terminal of the inductive load and is connected by a cathode thereof to the positive terminal of the HDCVS, and a third controllable switch, which is connected by a first input thereof to the first plate of the second capacitor (the boost capacitor), is connected by a second input thereof to the second plate of the second capacitor (the boost capacitor), is connected by a control input thereof to the output of the controllable square wave generator, and is connected by an output thereof to a control input of the first controllable switch. The DCVPVC further comprises electronically controlled resistor (ECR) and a second control voltage driver, the ECR being connected in series with a second terminal of the second controllable switch, with the limiting resistor and with the negative terminal of the HDCVS, the second control voltage driver being connected by an output thereof to a control input of the ECR. The connection of the controllable square wave generator to a control input of the second controllable switch can also be implemented using a matching buffer.

Providing the second control voltage driver and the ECR, with connections thereof, allows, when the controllable square wave generator supplies square pulses to the control inputs of the first and second controllable switches, to regulate the value (amplitude) of the linearly-increasing current through the inductance load (along the circuit comprising the HDCVS-the first controllable switch-the inductive load-the second controllable switch-the electronically controlled resistor-the limiting resistor). In this way, pulse voltage is obtained across the inductive load, the value of the voltage correlating with the rate of increase of the linearly-increasing current flowing through the inductance load.

Regulating amplitude of the linearly-increasing current flowing through the inductance load is carried out by applying control voltage from the output of the second control voltage driver to the control input of the ECR. When this takes place, the amplitude may vary over a wide range. Indeed, the resistance value of the ECR is controlled by the second control voltage driver. This value may change (when acted upon by the control voltage from the output of the second control voltage driver) from zero (and then the value of the linearly-increasing current is mainly defined by the resistance of the limiting resistor and is the highest one) up to values several times (ten and more) larger that the limiting resistor resistance, and then the amplitude of the linearly-increasing current becomes several times (ten and more) less than that at the zero resistance of the ECR (and then the value of the linearly-increasing current is the lowest one). Accordingly, the value of the inductive load pulse voltage decreases, as does the value of the linearly-increasing inductive load current upon the ECR resistance increase, and increases, as does the value of the linearly-increasing inductive load current upon the ECR resistance decrease.

In this manner, due to having the second control voltage driver and ECR with the connections thereof, the proposed converter can deliver variable output pulse voltage as the value of the inductive load linearly-increasing current varies. Consequently, as the output pulse voltage decreases, so does the level of pulse EMI radiated into the environment by the converter. Also, the above-discussed technical results in terms of providing an additional technique, which widens capacities for DC voltage-pulse voltage conversion (particularly switching power supply), shows itself in this.

Analysis performed among known prior art showed that none of them comprises either the whole aggregation of the essential features of the proposed solution or its distinguishing (characterizing) features, thus permitting the conclusion about meeting the criteria of novelty of, and inventive step in, the converter.

BRIEF DESCRIPTION OF THE DRAWINGS

The above and other features and advantages of the proposed apparatus are described in the ensuing specification with the reference to accompanying drawings where.

DETAILED DESCRIPTION

Figure 1:
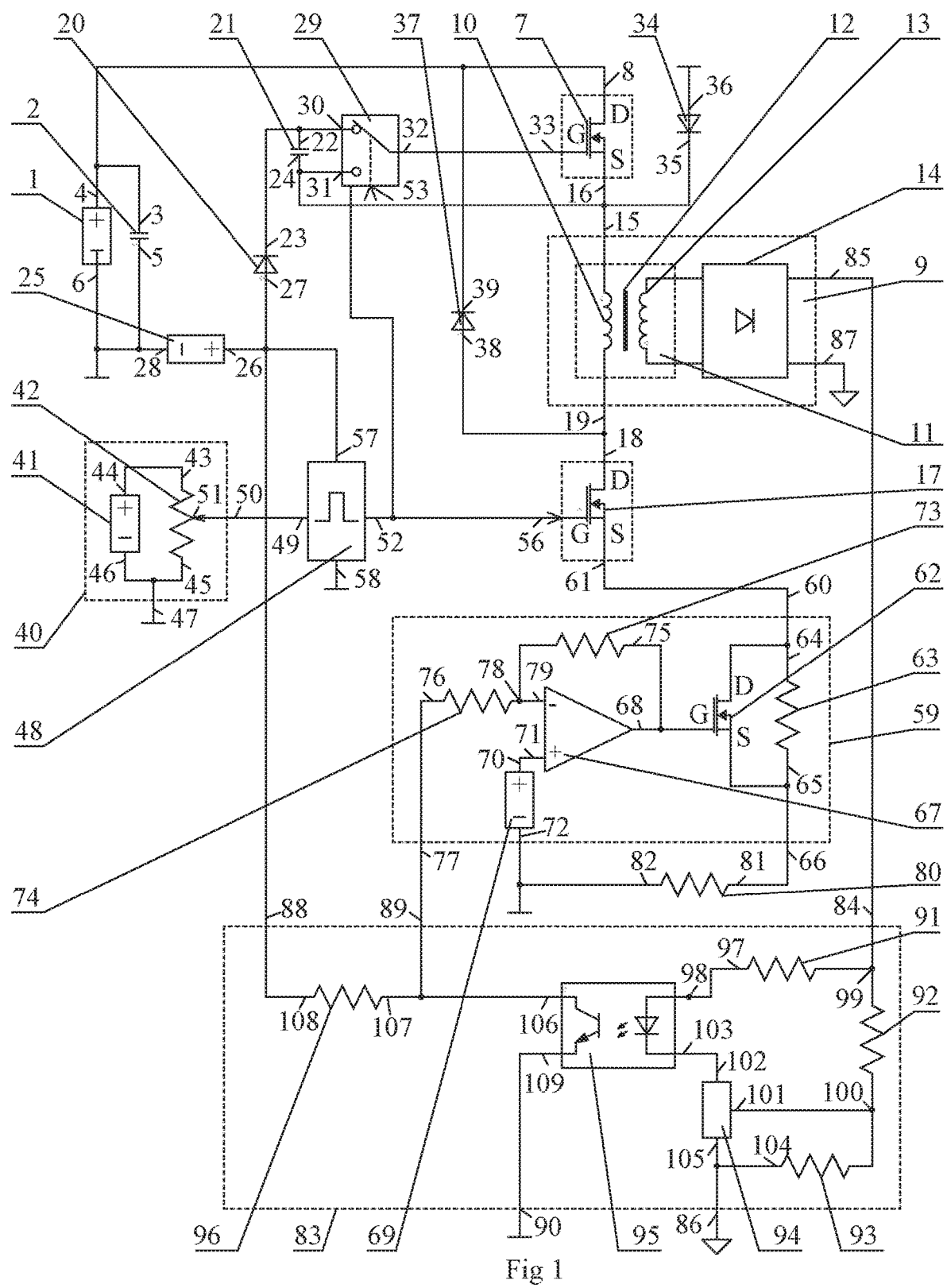
FIG. 1 presents a flow chart of the DC voltage—pulse voltage converter and FIG. 2 illustrates a modification of the design of FIG. 1, whereas FIG. 3 are charts illustrating the operation of the converter.
Figure 2:
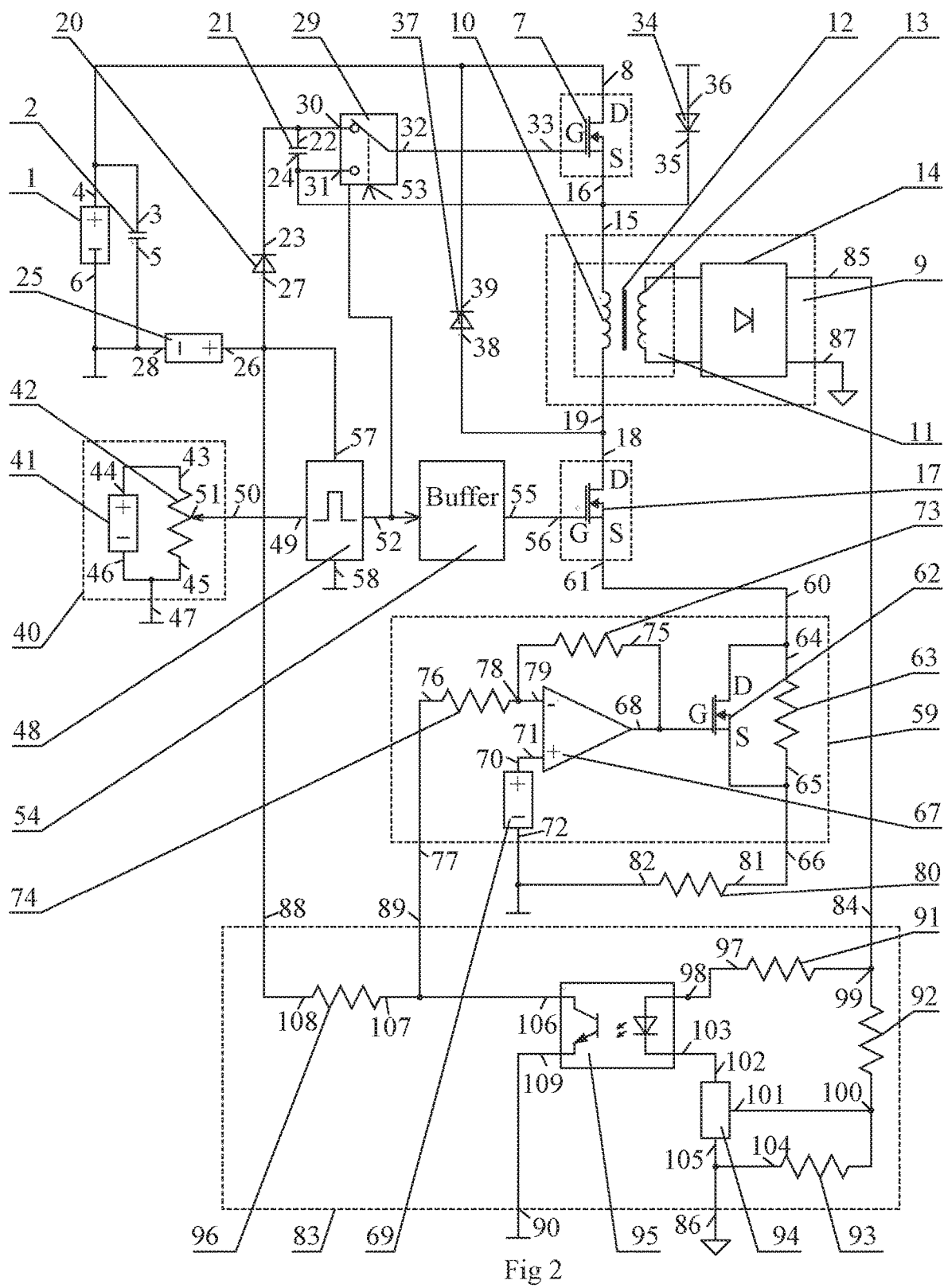

According to FIG. 1, the proposed DC voltage—pulse voltage converter (DCVPVC) comprises specifically:

(a) a high DC voltage source (HDCVS) 1;

(b) a first (storage) capacitor 2 connected by one (a first) plate 3 thereof to a positive terminal 4 of the HDCVS 1 and connected by another (a second) plate 5 thereof to a negative terminal 6 of the HDCVS 1;

(c) a first controllable switch 7 (including, for example, a MOS transistor) connected by a first terminal 8 thereof (by the drain of the MOS transistor) to the positive terminal 4 of the HDCVS 1;

(d) an inductive load 9 made, for example, as a winding on a magnetic core and including a primary winding 10 of a transformer 11 on a ferromagnetic core 12, a secondary winding 13 of the transformer 11 being connected to a rectifier 14 connected in turn to a load thereof (not shown), the inductive load 9 being connected by one (a first) terminal 15 thereof to a second terminal 16 (to the source of the MOS transistor) of the first controllable switch 7;

(e) a second controllable switch 17 made, for example, as a MOS transistor and connected by a first terminal 18 thereof (the drain of the MOS transistor) to a second terminal of the inductive load 9;

(f) a first diode 20 (a boost diode);

(g) a second capacitor 21 (a boost capacitor) connected by a first plate 22 thereof to a cathode 23 of the first diode 20 and connected by a second plate 24 thereof to the second terminal of the first controllable switch 7;

(h) a low DC voltage source (LDCVS) 25 connected by a positive terminal 26 thereof to an anode 27 of the first diode (the boost diode) 20 and connected by a negative terminal 28 thereof to the negative terminal 6 of the HDCVS 1;

(i) a third controllable switch 29 connected by a first input 30 thereof to the first plate 22 of the second capacitor (the boost capacitor) 21 and connected by a second input 31 thereof to the second plate 24 of the second capacitor (the boost capacitor) 21, and connected by an output 32 thereof to a control input 33 of the first controllable switch 7 (to a gate of the MOS transistor);

(j) a second diode (a first pick-off diode) 34 connected by a cathode 35 thereof to the second terminal of the first controllable switch 7 (to the source of the MOS transistor) and connected by an anode 36 thereof to the negative terminal 6 of the HDCVS 1;

(k) a third diode (a second pick-off diode) 37 connected by an anode 38 thereof to the second terminal 19 of the inductive load 9 and connected by a cathode 39 thereof to the positive terminal 4 of the HDCVS 1;

(l) a first control voltage driver 40 including, for example a DC voltage source 41 and a potentiometer 42 connected by a first terminal 43 thereof to a positive terminal 44 of the DC voltage source 41 and connected by a second terminal 45 thereof to a negative terminal 46 of the DC voltage source 41 (which is also a first terminal 47 of the first control voltage driver 40);

(m) a controllable square wave generator 48 connected by an input 49 thereof to an output 50 of the first control voltage driver 40 (the output 50 being also a third terminal (a slider) 51 of the potentiometer 42), connected by an output 52 thereof to a control input 53 of the third controllable switch 29 and to a matching buffer 54, and connected by power (feed) inputs 57 and 58 thereof to the positive, 26, and negative, 28, terminals of the LDCVS, respectively, an output 55 of the matching buffer 54 being connected to a control input 56 of the second controllable switch 17 (to the gate of the MOS transistor); the connection between the generator 48 and the switch 29 using the matching buffer 54 is shown in FIG. 2. However, this connection can be realized directly, without using the matching buffer 54, as illustrated by FIG. 1.

(n) an electronically controlled resistor (ECR) 59 connected by a first terminal 60 thereof to another terminal 61 of the second controllable switch 17 (to the source of the MOS transistor) and comprising, for example: (na) a MOS transistor 62 (the drain of the MOS transistor being the first terminal 60 of the ECR 59), (nb) an add-on resistor 63 connected by one terminal 64 thereof to the drain of the MOS transistor 62 and connected by another terminal 65 thereof to the source of the MOS transistor 62 and to a second terminal 66 of the ECR 59, (nc) an operational amplifier (OA) 67 connected by an output 68 thereof to the gate of the MOS transistor 62, (nd) an offset voltage source (OVS) 69 connected by a positive terminal 70 thereof to a non-inverting ("+") input 71 of the OA 67 and connected to a negative terminal 72 thereof to the negative terminal 6 of the HDCVS 1, and (ne) first, 73, and a second, 74, resistors connected to each other and jointly defining transmission efficiency of the OA 67, one (a first) terminal 75 of the first resistor 73 being connected to the output 68 of the OA 67, another (a second) terminal 76 of the second resistor 74 being a control input 77 of the ECR 59, and a point 78 of connection of the first, 73, and second, 74, resistors being connected to an inverting ("−") input 79 of the OA 67;

(p) a limiting resistor 80 connected by one (a first) terminal 81 thereof to the second terminal 66 of the ECR 59 and connected by another (a second) terminal thereof to the negative terminal 6 of the HDCVS 1; and (q) a second control voltage driver 83 connected by a first input 84 thereof to a first output 85 of the rectifier 14, and connected by a first output 86 thereof to a second output 87 of the rectifier 14, and connected by a second output 88 to the positive terminal 26 of the LDCVS 25, and connected by a second output 89 thereof to the control input 77 of the ECR 59, and connected by a third output 90 thereof to the negative terminal 6 of the HDCVS 1 and to the second terminal 47 of the first control voltage driver 40.

The second control voltage driver 83 can comprise, for example, connected in series a current-limiting resistor 91 and a first, 92, and a second, 93, voltage divider resistors, as well as a current regulator 94, an optocoupler 95 and a feed resistor 96. A first terminal 97 of the current-limiting resistor 91 is connected to a first input 98 of the optocoupler 95, a point 99 of connection the current limiting resistor 91 and the first resistor 92 of the voltage divider is the first input 84 of the second control voltage driver 83, a point 100 of connection of the first, 92, and second, 93, resistors of the voltage divider is connected to a control input 101 of the current regulator 94, a first terminal 102 of the current regulator 94 is connected to a second input 103 of the optocoupler 95, a second terminal 104 of the second resistor 93 of the voltage divider is connected to a second terminal 105 of the current regulator 94 and represents the first output 86 of the second control voltage driver 83. A first output 106 of the coupler 95 is connected to a first terminal 107 of the feed resistor 96 and represents the second output 89 of the second control voltage driver 83, a second terminal 108 of the feed resistor 96 is the second input 88 of the second control voltage driver 83, and a second output 109 of the optocoupler 95 is connected to the third input 90 of the second control voltage driver 83.

Figure 3:
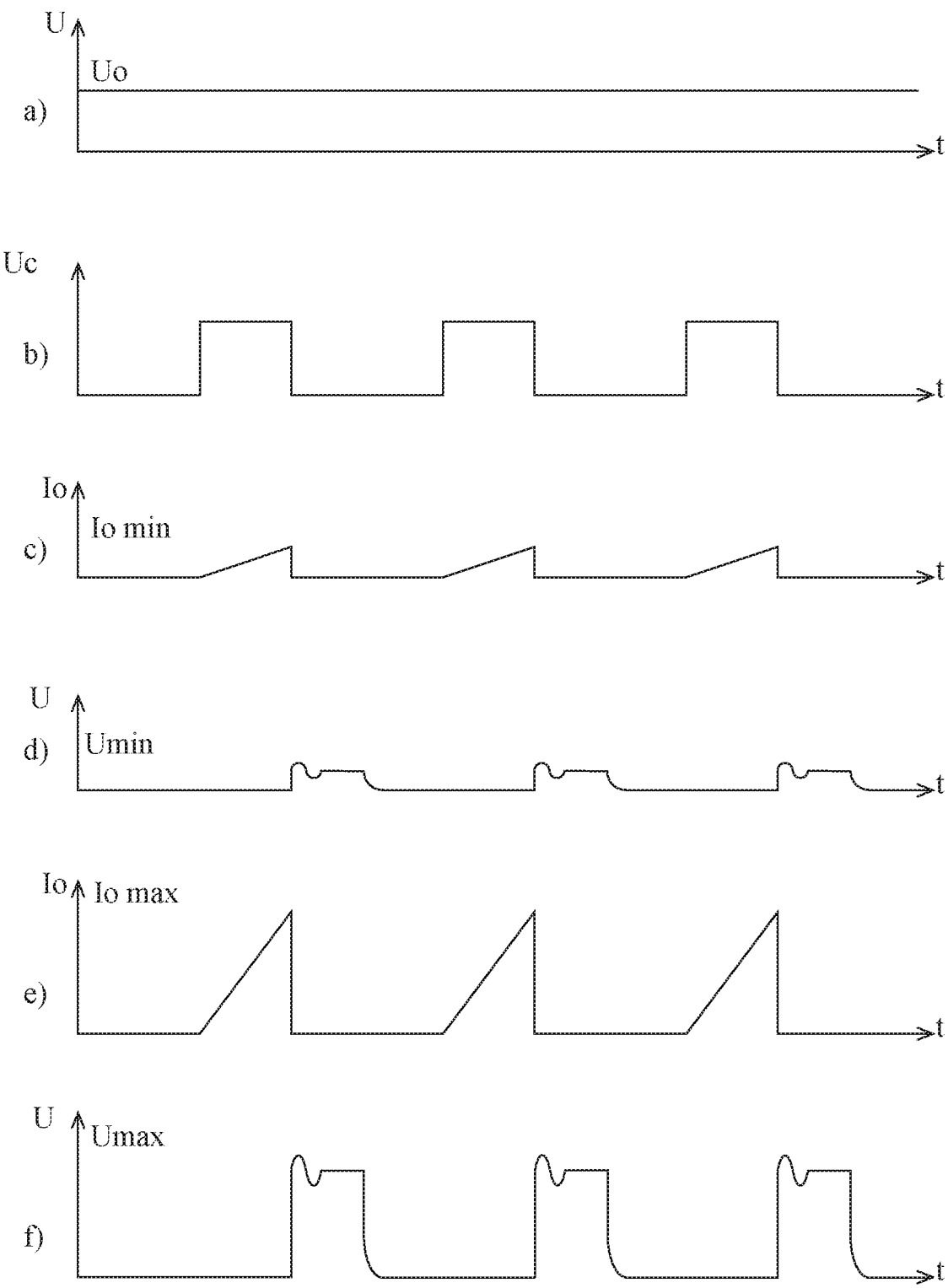

Charts of FIG. 2 illustrate timing waveforms of voltages present in the converter showing (when viewed with FIG. 1 as well):

output DC voltage of the HDCVS 1 (FIG. 3a);

pulses $U_{ctr}$ at the output 52 of the controllable square wave generator 48 (FIG. 3b);

linearly-increasing current flowing through the inductive load 9 at the highest resistance of the ECR 59 and reaching the lowest value $I_{0\ min}$ by the end of the pulse $U_{ctr}$ (FIG. 3c);

high pulse voltage $U_{min}$ between the terminal 19 of the inductive load 9 and the negative terminal 6 of the HDCVS 1 at the highest resistance of the ECR 59 (FIG. 3d);

linearly-increasing current flowing through the inductive load 9 at the lowest resistance of the ECR 59 and reaching the highest value $I_{0\ max}$ by the end of the pulse $U_{ctr}$ (FIG. 3e);

high pulse voltage $U_{max}$ between the terminal 19 of the inductive load 9 and the negative terminal 6 of the HDCVS 1 at the lowest resistance of the ECR 59 (FIG. 3f).

The proposed DC voltage to variable pulse voltage converter operates as follows.

As DC voltage from the terminals of the LDCVS 25 is applied to the feed inputs 57 and 58 of the controllable square wave generator 48, the latter starts generating square pulses (see FIG. 3b), the pulse ratio of the square pulses being defined by the value of the control voltage applied to the control input 49 of the controllable square wave generator 48 from the output 50 of the first control voltage driver 40.

Changing the control voltage at the output 50 of the first control voltage driver 40 (in order to change the pulse ratio of the square pulses) can be achieved, for example, by moving the slider 51 of the potentiometer 42 connected by the terminals 43 and 45 thereof to the positive, 44, and negative, 46, terminals of the DC voltage source 41, respectively.

Further, square pulses of the set pulse ratio come from the output 52 of the controllable square wave generator 48 via the matching buffer 54 (or directly) to the control input 56 of the second controllable switch 17 (to the gate of the MOS transistor thereof) with the resulting opening of the second controllable switch 17.

At the same time, square pulses come from the output 52 of the controllable square wave generator 48 to the control input 53 of the third controllable switch 29. As a result, a potential is applied from the second capacitor 21 (the boost capacitor) to the control input 33 of the first controllable switch 7 (to the gate of the MOS transistor thereof), this potential exceeding a potential at the second terminal 16 of the first controllable switch 7 (at the source of the MOS transistor thereof) by the value approximately equal to the output voltage of the LDCVS 25.

The applying of that potential opens the first controllable switch 7 virtually contemporaneously with the opening of the second controllable switch 17. As a result, current starts flowing through the inductive load 9 in the circuit of the positive terminal 4 of the HDCVS 1-the open first controllable switch 7-the inductive load 9-the open second controllable switch 17-the ECR 59-the limiting resistor 80-the negative terminal 6 of the HDCVS 1.

In this way, using the succession of the control pulses, the inductive load 9 is periodically connected to the outputs of the HDCVS 1, and pulse current flowing through the inductive load 9 is generated.

The self-induced emf resulting in the inductive load 9 prevents the current in the above-identified circuit from varying instantaneously. Due to that, the current increases linearly during the square pulse (FIGS. 2c and 2e), when the square pulse ends, the current amplitude reaches a preset value of $I_0$ (either $I_{0\ min}$—FIG. 3c, or $I_{0\ max}$—FIG. 3e, or an intermediate value $I_0$), and the value of high pulse voltage between the terminal 19 of the inductive load 9 and the negative terminal 6 of the HDCVS 1 is proportional to the rate of increase of the current and, consequently, to the value $I_0$.

On the other hand, the value of the current $I_0$ is defined by resistance of all elements of the above-mentioned circuit, namely $$I_0 = K_1/(R_{sw1} + R_{sw2} + R_{lim} + R_{ecr}) \qquad (1),$$

where $K_1$ is the first proportionality coefficient, $R_{sw1}$—resistance of the first controlled switch 7 when it is open (the resistance of the open MOS transistor), $R_{sw2}$—resistance of the second controllable switch 17 when it is open (the resistance of the open MOS transistor), $R_{lim}$—resistance of the limiting resistor 80, and $R_{ecr}$—resistance of the ECR 59.

Because of smallness of $R_{sw1}$ and $R_{sw2}$ ($R_{sw1} \ll R_{lim}$ and $R_{sw2} \ll R_{lim}$), the formula (1) can be reduced to the form $$I_0 = K_1/(R_{lim} + R_{ecr}) \qquad (2)$$

Therefore, the amplitude of the current $I_0$ and, hence, the value of the high pulse voltage between the terminal 19 of the inductive load 9 and the negative terminal 6 of the HDCVS 1 can be changed by setting the value of resistance of the ECR 59.

Such a change is needed under the change of the output voltage of the rectifier 14 between the first, 85, and the second, 87, outputs thereof (for example, when load resistance of the rectifier 14 changes). This changing voltage is applied to the first input 84 of the second control voltage driver 83 and is passed, through the current-limiting resistor 91, to the first input 98 of the optocoupler 95. Due to that, flowing through the optocoupler 95 is a changing current, the value of this current depending on the voltage at the first input 98 of the optocoupler 95 and on parameters of the first, 92, and second, 93, resistors of the voltage divider, as well as on parameters of the current regulator 94. Accordingly, changing voltage appears at the output 106 of the optocoupler 95, as well as at the first terminal 107 of the feed resistor 96, the second terminal 108 thereof being connected through the second input 88 of the second control voltage driver 83 to the positive terminal 26 of the LDCVS 25. The changing voltage is passed to the second output 89 of the second control voltage driver 83.

As the voltage at the second output 89 of the second control voltage driver 83 changes, the control voltage (which comes from the second output 89 of the second control voltage driver 83 to the control input 77 of the ECR 59) is applied through the second resistor 74 to the inverting ("−") input 79 of the OA 67 serving as a DC voltage amplifier. When this takes place, the operating mode of the OA 67 is set by a voltage at the positive output 70 of the OVS 69 which is applied to the non-inverting ("+") input 71 of the OA 67. Due to that, a control signal is generated at the output 68 of the OA 67 coming to the gate of the MOS transistor 62 of the ECR 59, the value of the control signal being defined by the resistance ratio of the first, 73, and the second, 74, resistors setting the transmission efficiency of the OA 67. When the control signal is zero, the MOS transistor 62 of the ECR 59 is closed, does not have a shorting impact on the value of resistance $R_{add}$ of the add-on resistor 63, and, therefore, the resistance of the ECR 59 is maximal and comes to $$R_{ecr} = R_{add}, \quad (3)$$

whereas the current $I_0$ is minimal and is equal to $$I_{0\ min} = K_1/(R_{lim} + R_{add}) \quad (4)$$

The minimal value of the current $I_{0\ min}$ flowing through the inductive load 9 at $R_{ecr} = R_{add}$ (see the chart in FIG. 3c) is followed by the minimal value of the high pulse voltage between the terminal 19 of the inductive load 9 and the negative terminal 6 of the HDCVS 1 (see the chart in FIG. 3d) and, consequently, the minimal value of the pulse EMI radiated by the converter into the environment.

As the output voltage of the second control driver 83 changes (which may take place, for example, when the output voltage of the rectifier 14 decreases), the control signal, coming to the gate of the MOS transistor 62 of the ECR 59, increases and opens the MOS transistor 62 of the ECR 59. Due to that, the resistance of the MOS transistor 62 of the ECR 59 begins to decrease and have a shorting impact on the value of resistance $R_{add}$ of the add-on resistor 63, and, therefore, the resulting resistance of the ECR 59 begins to decrease as well. In the limit, where the control signal coming to the gate of the MOS transistor 62 of the ECR 59 is so large that the MOS transistor 62 of the ECR 59 is fully open, it shorts the add-on resistor 63, the resistance of the ECR 59 comes close to zero, and the amplitude of the current $I_0$ becomes maximal and equal to $$I_{0\ max} = K_1/R_{lim} \quad (5)$$

The maximal value of the current $I_{0\ max}$ flowing through the inductive load 9 at $R_{ecr} = 0$ (see the chart in FIG. 3e) is followed by the maximal value of the high pulse voltage between the terminal 19 of the inductive load 9 and the negative terminal 6 of the HDCVS 1 (see the chart in FIG. 3f) and, consequently, the maximal value of the pulse EMI radiated by the converter into the environment.

In this way, by changing the resistance of the ECR 59 through regulating output voltage of the second control voltage driver 83, it becomes possible in the proposed design to change the amplitude of the current flowing through the above-identified circuit in the range from $I_{0\ min}$ to $I_{0\ max}$ and, accordingly, to change the value of the high pulse voltage between the terminal 19 of the inductive load 9 and the negative terminal 6 of the HDCVS 1.

In prior art designs, including the prototype, the pulse ratio is changed by, for example, the first control voltage driver 40 and the controllable square wave generator 48. However, as the pulse ratio changes, the amplitude of the current $I_0$ remains unchanged and equal to $I_{0\ max}$. Consequently, the value of the high pulse voltage between the terminal 19 of the inductive load 9 and the negative terminal 6 of the HDCVS 1 remains unchanged as well.

In this case, a portion of pulse power $$P_{rad} = K_2 I_{0\ max}^2, \quad (6)$$

where $K_2$ is the second coefficient of proportionality, is radiated into the environment as the pulse lasts.

The radiation of the portion of pulse power into the environment gives rise to pulse EMI negatively affecting the operation of radio and electronic equipment located nearby. Besides, the radiation of pulse EMI into the environment aggravates the ecological situation in the human habitat.

The proposed design makes it possible to change not only the pulse ratio but also the value of the high pulse voltage between the terminal 19 of the inductive load 9 and the negative terminal 6 of the HDCVS 1 which allows to decrease the level of pulse EMI radiated by the proposed converter into the environment.

Concurrently with the current flowing through the inductive load 9, another current flows through the open second controllable switch 17 along the following circuit: the positive terminal 26 of the LDCVS 25-the first diode 20 (the boost diode)-the second capacitor 21 (the boost capacitor)-the inductive load 9-the open second controllable switch 17-the ECR 59-the limiting resistor 80-the negative terminal 28 of the LDCVS 25. Because of that, the second capacitor 21 (the boost capacitor) is charged up to the value approximately equal to the output voltage of the LDCVS 25. After the square pulse ends, the first, 7, and second, 17, controllable switches close, but the voltage difference across the plates of the second capacitor 21 (the boost capacitor) is preserved making possible the opening of the first controllable switch 7 in the next cycle of the converter operation.

Upon closing the first, 7, and second, 17, controllable switches, high voltage emerges between the terminal 19 of the inductive load 9 and the negative terminal 6 of the HDCVS 1 due to self-induced emf. As soon as this high voltage exceeds the value of the output voltage of the HDCVS 1, the third diode 37 (the second pick-off diode) and the second diode 34 (the first pick-off diode) open, and current starts flowing through them along the following circuit: the negative terminal 6 of the HDCVS 1-the second diode 34 (the first pick-off diode)-the inductive load 9-the third diode 37 (the second pick-off diode)-the first (storage) capacitor 2-the negative terminal 6 of the HDCVS 1. In this way, besides transferring energy into the payload, energy is being stored in the first (storage) capacitor 2, thus contributing to efficiency upgrading. This takes place in both the proposed converter and the prototype where same technique is also used.

However, the proposed converter, performing same functions as the prior art, has an obvious advantage over it. It is able to change not only pulse ratio of control square pulses but also the amplitude of the current flowing through the inductive load 9, whereby the value of the high pulse voltage between the terminal 19 of the inductive load 9 and the negative terminal 6 of the HDCVS 1 becomes changeable. This feature conduce to lowering the level of pulse EMI radiated by DC voltage-pulse voltage converters into environment and serves an additional technique-widening capacities for DC voltage-pulse voltage conversion.

The functional units the proposed converter comprises can be implemented in various ways.

For example, a pulse-width modulator microchip, such as UCC2813QDR-5Q1 of Texas Instruments, or a pulse-frequency modulator microchip, such as FAN-6300H of Fairchild Semiconductor, or any other circuit that can change pulse ratio for square pulses can be used as the controllable square wave generator 48.

The first control voltage driver 40 can be realized as shown in FIG. 1 or as any circuit converting a control input into control voltage, including that with feedback and/or digital control protocols.

The second control voltage driver 83 can be realized as shown in FIG. 1 or by using standard reference voltage sources and operational amplifiers, as well as by any other conversion of a control input into voltage controlling the ECR, including that with feedback and/or digital control protocols.

TL 431 of Texas Instruments or its analogs can be used as the current regulator 94 shown in FIG. 1.

Transistors of the controllable switches 7 and 17 can be of bipolar, MOS or IGBT type; the switches can also comprise additional circuitry to improve their performance.

Low voltage sources 25, 41, and 69 that form a part of the converter as a whole and a part of the first control voltage driver 40 and the ECR 59 can be shaped as a single LDCVS provided with respective potentiometer-type voltage dividers.

The ECR 59 can be made as shown in FIG. 1, or using circuitry presented in the USSR author certificate SU 1807554, or any other circuit that is able to change the resistance of a portion of the circuit from near-zero to the value comparable with the value of $R_{lim}$.

As the second and third diodes, any devices with unidirectional conductance, such as controllable bipolar transistors, or MOS transistors, or IGBT transistors, etc., can be used.

The matching buffer 54, which matches arrival of control pulses at the inputs of the first, 7, and second, 17, controllable switches, can be realized as a series connection of a delay circuit and an amplifier. As an alternative, the matching booster can be replaced by a bridge (direct) connection.

All other elements of the converter are well known from various publications on pulse technique and radioelectronics.

In any of the above-discussed implementation of the functional units of the converter, it is made possible to change the amplitude of the current flowing through the inductive load and, hence, the value of the output voltage. Therefore, the level of the pulse EMI radiated into the environment decreases, and the technical result matching the claimed one is achieved.

What is claimed is:

1. A DC voltage-pulse voltage converter comprising:
   a high DC voltage source (HDCVS);
   a first capacitor connected by a first plate thereof to a positive terminal of the HDCVS and connected by a second plate thereof to a negative terminal of the HDCVS;
   a first controllable switch connected by a first terminal thereof to the positive terminal of the HDCVS;
   an inductive load connected by a first terminal thereof to a second terminal of the first controllable switch;
   a second controllable switch connected by a first terminal thereof to a second terminal of the inductive load;
   a limiting resistor;
   a low DC voltage source (LDCVS) connected by a negative terminal thereof to the negative terminal of the HDCVS;
   a controllable square wave generator connected by an output thereof to a control input of the second controllable switch;
   a first control voltage driver connected by an output thereof to an input of the controllable square wave generator;
   a first diode connected by a anode thereof to a positive terminal of the LDCVS;
   a second capacitor connected by a first plate thereof to a cathode of the first diode and connected by a second plate thereof to a second terminal of the first controllable switch; and
   a third controllable switch connected by a first input thereof to the first plate of the second capacitor, connected by a second input thereof to the second plate of the second capacitor, connected by an output thereof to a control input of the first controllable switch, and connected by a control input thereof to the output of the controllable square wave generator,
   an electronically controlled resistor connected in series with a second terminal of the second controllable switch, the limiting resistor and the negative terminal of the HDCVS; and
   a second control voltage driver connected by an output thereof to a control input of the electronically controlled resistor.

2. The converter according to claim 1 wherein the connection between the output of the controllable square wave generator and the control input of the second controllable switch is made via a matching buffer.

* * * * *